United States Patent [19]

Kitajima et al.

[11] 3,915,795

[45] Oct. 28, 1975

[54] PROCESS FOR PRODUCING L-5-METHOXYTRYPTOPHAN USING MICROORGANISMS

[75] Inventors: Nakao Kitajima, Tokyo; Shiro Watanabe, Saitama; Isao Takeda, Tokyo, all of Japan

[73] Assignee: Asahi Kasei Kogyo Kabushiki Kaisha, Osaka, Japan

[22] Filed: Dec. 8, 1972

[21] Appl. No.: 313,462

[30] Foreign Application Priority Data
Dec. 10, 1971 Japan.................................. 46-99394

[52] U.S. Cl.................. 195/29; 195/36 R; 195/37; 195/47
[51] Int. Cl.$^2$........................................ C12D 13/06
[58] Field of Search............ 195/49, 29, 47, 30, 37, 195/36

[56] References Cited
UNITED STATES PATENTS

| 2,999,051 | 9/1961 | Malin | 195/29 |
| 3,808,101 | 4/1974 | Enei et al. | 195/29 |

OTHER PUBLICATIONS

Chem. Abstracts, 71:99120g.
Chem. Abstracts, 75:87103f.
Chem. Abstracts, 69:960n.
Morino et al., J. of Biol. Chem., Vol. 242, No. 12, pp. 2793-2799.

*Primary Examiner*—A. Louis Monacell
*Assistant Examiner*—Thomas G. Wiseman
*Attorney, Agent, or Firm*—Flynn & Frishauf

[57] ABSTRACT l-5-Methoxytryptophan, a material for 5-hydroxytryptophan which is useful as an antidepressant and has hormonal actions against Down's syndrome and the like, is produced by culturing a microorganism, which can produce L-5-lower alkoxytryptophan, in a culture medium containing 5-lower alkoxyindole, together with or without serine, in addition to a carbon source, a nitrogen source, inorganic salts and nutrients.

5 Claims, No Drawings

PROCESS FOR PRODUCING L-5-METHOXYTRYPTOPHAN USING MICROORGANISMS

This invention relates to a process for producing L-5-lower alkoxytryptophan. More particularly, the invention pertains to a process for producing a L-5-lower alkoxytryptophan from a 5-lower alkoxyindole using a microorganism. More specifically, the invention is concerned with a process for producing a L-5-lower alkoxytryptophan from a 5-lower alkoxyindole, together with or without serine, using a microorganism having an ability of producing a L-5-lower alkoxytryptophan from a 5-lower alkoxyindole. A L-5-Lower alkoxytryptophan is an intermediate for use in the production of L-5-hydroxytryptophan (hereinafter referred to as "L-5-HTP"), which is useful as an antidepressant and has various hormonal actions against Down's syndrome (Mongolism) and the like diseases. Further, L-5-HTP is an extremely important metabolic intermediate for synthesizing in the metabolic system of a living body such intracerebral amine type hormones as L-5-hydroxy-tryptamine (serotonin), L-5-methoxytryptamine and N-acetyl-L-5-methoxytryptamine (melatonin) from a L-tryptophan. On the other hand, L-5-lower alkoxytryptophan is similar in structure to L-5-HTP, and hence is sufficiently expected to be put, as it is, into such uses as pharmaceuticals and reagents.

As chemical processes for producing a L-5-lower alkoxytryptophan, particularly L-5-methoxytryptophan (hereinafter referred to as "5-MTP"), there have heretofore been reported a process for using 5-methoxygramine and acetamide as starting materials [J. W. Cook et al.: "J. Chem. Soc.," 1203 (1951)] and a process using formamide malonate ester [Asami: "Nagasaki Medical Report," 30 490 (1955)]. These processes, however, are complex in production steps, and give a DL-body and not a L-body. It is needless to say that the form of L-5-HTP which is usable as a pharmaceutical is limited to the L-body. The D-body does not only display no effect as a pharmaceutical but is sometimes harmful to the living body. In order to be used as a material for the production of L-5-HTP usable as a pharmaceutical, therefore, the DL-5-MTP obtained according to the chemical synthesis processes should be subjected to optical resolution.

On the other hand, no biochemical process for the production of a L-5-lower alkoxytryptophan has yet been reported hitherto.

Processes for producing L-5-HTP according to a microbiological procedure using 5-hydroxyindole as a main starting material were also studied by the present inventors and by other researchers, and already well know. However, both L-5-HTP and 5-hydroxyindole have free OH groups and hence are somewhat unstable as compounds, so that they tend to bring about such undesirable side-reactions as to be colored somewhat red at the time of production or purification.

The production of L-5-HTP from a L-5-lower alkoxytryptophan can be easily accomplished by reductive demethylation or the like reaction. A L-5-Lower alkoxytryptophan is stable and does not bring about coloration or the like phenomenon during the above-mentioned reductive reaction. Further, the starting 5-methoxyindole (hereinafter referred to as "5-MI") used for the production of L-5-HTP, for example, is soluble in toluene or a like organic solvent. Accordingly, the process of the present invention is more simple, in the removal of unreacted 5-MI from the reaction liquid for example, than the process for producing L-5-HTP from 5-hydroxyindole.

An object of the present invention is to provide a novel process for producing by fermentation a L-5-lower alkoxytryptophan, whose alkoxy group has one to four carbon atoms.

Other objects and advantages of the invention will become apparent from the description made hereunder.

The explanation made below is directed to the case of L-5-MTP, but the case of a L-5-lower alkoxytryptophan, whose alkoxy has two to four carbon atoms, also corresponds to the case of L-5-MTP.

Microorganisms:

Microorganisms are selected based upon the degree of L-5-MTP-producing ability.

The degree of L-5-MTP-producing ability was measured in the following manner:

A liquid containing 2 mg/ml. of 5-MI, 10 mg/ml. of L-serine, 0.1 mmol/ml. of phosphate buffer (pH 8.0) and 80 mg/ml. of freeze-dried test strain was allowed to react for a definite period of time. From a definite amount of the reaction liquid, unreacted 5-MI was removed by toluene extraction to obtain a fraction. This fraction was subjected to the colorimetric determination according to xanthydrol method [S. R. Dickman et al.: "J. B. C.," 220, 957 (1956)]. Subsequently, the concentration of L-5-MTP in the reaction liquid was calculated from the standard curve. According to the above-mentioned determination method, the strains *Corynebacterium sp.* No. 14001 NRRL B-5395 and *Escherichia coil* ATCC 9637 mentioned later gave L-5-MTP in amounts of 1.65 mg/ml. and 2.50 mg/ml., respectively. Accordingly, microorganisms usable in the present invention may be those which have an ability of producing L-5-MTP in an amount of 0.1 mg/ml. or more as measured according to the above-mentioned method.

Concretely, bacteria usable in the present invention are strains belonging to the genera Brevibacterium, Corynebacterium, Arthrobacter, Microbacterium, Micrococcus, Sarcina, Staphylococcus, Bacillus, Serratia, Escherichia, Aerobacter, Proteus, Erwinia, Pseudominas, Xanthomonas, Protaminobacter, Flavobacterium, Achromobacter, Agrobacterium and Azotobacter. Yeasts usable in the present invention are strains belonging to the genera Saccharomyces, Candida, Tolulopsis, Brettanomyces and Hansenula. Actinomyces usable in the present invention are strains belonging to the genera Nocardia and Streptomyces. Molds usable in the present invention are strains belonging to the genera Aspergillus and Penicillium. For example, such strains as mentioned in the examples are usable. However, microorganisms usable in the present invention are not limited to those mentioned above, and microorganisms belonging to the above-mentioned genera which have an L-5-MTP-producing ability, and variants thereof, may also be used.

Cultivation:

The medium used in the present invention contains 5-MI, together with or without serine, in addition to a carbon source, a nitrogen source, inorganic salts and natural organic nutrients which are suitable for the good growth of the microorganism used and for the smooth production of L-5-MTP.

Examples of the carbon source include glucose, fructose, sucrose, mannose, starch, sorbitol, glycerol, alcohols, acetic acid and citric acid. These may be used either alone or in combination of two or more. The concentration of the carbon source is not particularly limited, but is preferably from 1 to 10% (wt/vol).

Examples of the nitrogen source include ammonia, urea, ammonium sulfate, ammonium acetate, ammonium nitrate and sodium nitrate. These may be used either alone or in combination of two or more.

Examples of the inorganic salts include sodium, potassium, magnesium, manganese, iron and calcium salts of phosphoric, sulfuric and the like acids.

Examples of the organic nutrients having effects of promoting the growth of the strain used include peptone, meat extract, corn steep liquor, casamino acids, yeast extract and soybean flour. In addition, small amounts of vitamins and nucleic acids may be incorporated into the medium.

The manner of addition of 5-MI, together with or without serine, is as follows:

In a process in which the growth of microorganism is conducted simultaneously with the production of L-5-MTP, 5-MI, together with or without serine, may be added directly to the culture liquor. In a process in which is used a microorganism, which has been cultured and has once been taken out of the culture liquor, 5-MI together with or without serine is added to a suspension of the microorganism. In addition to living microorganisms, there may be used dried microorganisms which have been subjected to freeze-drying or the like treatment, microorganisms which have been ground, microorganisms which have been subjected to ultrasonic treatment, and microorganisms which have been treated with such organic solvent as acetone, ethanol or toluene.

The 5-MI and serine may be used at various concentrations, but are desirably used individually at a concentration of about 0.2 to 20 g/liter. These may be added either at one time or divisionally. In case a large amount of 5-MI is desired to be added directly to the culture liquor, the addition is preferably conducted after the microorganism has substantially grown, whereby favorable results can be obtained. In the present invention, both L-serine and DL-serine may be used.

The cultivation may be effected either under aerobic conditions according to shaking culture or aerobic stirring culture, or under anaerobic conditions according to stationary culture. The type of cultivation is decided according to the kind of microorganism used. The pH of the medium is preferably from 4 to 9. The cultivation temperature is in the range from 20° to 40°C., preferably from 25° to 37°C. In case a microorganism isolated from the culture liquor is used, the reaction is preferably carried out at a pH from 7 to 10 and a temperature from 25° to 40°C. For the control of pH, there may be used a known neutralizing agent such as ammonia, sodium hydroxide, potassium hydroxide, calcium carbonate or hydrochloric acid. The cultivation time or the reaction time varies depending on the manner of addition and the concentration of starting material and on the kind of strain used. Ordinarily, however, L-5-MTP is produced and accumulated in a period of 1 to 5 days. According to the present invention, 0.1 to 50 g/liter of L-5-MTP can be accumulated in the culture liquor (or the reaction liquid).

The thus accumulated L-5-MTP can be isolated according to a process known per se. That is, the L-5-MTP is adsorbed on active carbon or such ion exchange resin as Dowex-1 ($CH_3COO^-$ type) or the like, eluted with hot ethanol or the like organic solvent or with acetic acid, concentrated, and then recovered by addition of alcohol.

Production of 5-HTP from 5-MTP:

The production of 5-HTP from 5-MTP can be easily accomplished according to demethylation or the like reaction using hydriodic acid. The demethylation reaction using hydriodic acid is described in further detail below.

The reaction liquid used in said reaction comprises L-5-MTP, hydriodic acid (specific gravity 1.7), acetic anhydride, etc. The reaction is sometimes promoted by use of a catalyst such as red phosphorus. Further, the injection of nitrogen gas or carbon dioxide into the reaction liquid is effective for inhibiting the reaction product from decomposition. The L-5-MTP may be used at various concentrations, but is desirably used at a concentration of about 10 to 150 g/liter. It may be added either at one time or incrementally. The reaction temperature is in the range from 20° to 90°C., preferably from 40° to 80°C. The reaction time varies depending on the concentration of L-5-MTP, the presence or absence of catalyst and the reaction temperature. Ordinarily, however, the reaction is complete within several minutes to several hours (about 5 to 6 hours). According to the present invention, 5 to 50 g/liter of L-5-HTP can be produced in the reaction liquid. The thus produced L-5-HTP can be isolated according to a process known per se. That is, the L-5-HTP is adsorbed on active carbon or such ion exchange resin as Dowex-1 or the like, desorbed, concentrated, and then recovered by addition of alcohol or the like.

The present invention is illustrated in more detail below with reference to examples, but the examples are for mere illustration and should not be construed as limiting the scope of the invention. In the examples, the percentage are wt/vol%. For the production of another L-5-lower alkoxytryptophan (alkoxy: $C_2 - C_4$), 5-MI having corresponding alkoxy groups is used in place of 5-MI having a methoxy groups.

EXAMPLE 1

A microorganism *Corynebacterium sp.* No. 14001, NRRL B-5395 was inoculated in a shaking flask containing 50 ml. of a medium (pH 7.0) containing 1.0% of peptone, 1.0% of meat extract, 0.4% of sodium chloride and 0.1% of yeast extract, and was cultured while shaking the flask reciprocally at 30°C. for 24 hours. The thus cultured microorganism was collected and suspended in 60 mM of a phosphate buffer (pH 8.5). To the resulting suspension were added 20 mg. of 5-MI, 20 mg. of L-serine and 120 mg. of glucose, and the total volume of the suspension was made 20 ml. Subsequently, the suspension was allowed to react under stirring at 30°C. for 16 hours, while maintaining the suspension at a pH of 8.5. As a result, 1.35 mg/ml. of L-5-MTP was accumulated in the reaction liquid.

Subsequently, the same reaction as above was effected to obtain a reaction liquid. This reaction liquid was mixed with the aforesaid reaction liquid to obtain 950 ml. of a mixed liquid. The mixed liquid was subjected to active carbon treatment to isolate 470 mg. of crude crystals of L-5-MTP. 400 Milligrams of the crude crystals were allowed to react, together with 4 ml. of hydriodic acid and 4 ml. of acetic anhydride, at 50°C. for 90 minutes while introducing nitrogen, to produce 15.7 mg/ml. of L-5-HTP.

EXAMPLE 2

The microorganisms shown in Table 1 were individually inoculated in a shaking flask containing 50 ml. of a liquid medium (pH 7.0) containing 3% of glucose, 0.6% of urea, 0.7% of peptone, 0.3% of yeast extract, 0.1% of $KH_2PO_4$, 0.1% of $K_2HPO_4$, 0.05% of $MgSO_4$.7-$H_2O$ and 0.001% of $MnSO_4$.$4H_2O$, and cultured while shaking the flask reciprocally at 30°C. At the 32nd hour of the cultivation, 1.0 mg/ml. of 5-MI and 2.0 mg/ml. of DL-serine were added to the medium, and the cultivation was continued for additional 24 hours. As the result, L-5-MTP was produced and accumulated in the medium in such amounts as shown in Table 1.

Table 1

| Microorganism | L-5-MTP (mg/ml) |
|---|---|
| Brevibacterium ammoniagenes ATCC 6872 | 0.21 |
| Corynebacterium melassecola ATCC 17965 | 0.39 |
| Arthrobacter globiformis ATCC 8010 | 0.20 |
| Microbacterium ammoniaphilum ATCC 15354 | 0.33 |
| Micrococcus luteus ATCC 21102 | 0.30 |
| Sarcina lutea ATCC 15176 | 0.35 |
| Staphylococcus citreus ATCC 4012 | 0.22 |
| Bacillus subtilis ATCC 14593 | 0.28 |
| Serratia marcescens IFO 3046 | 0.46 |
| Escherichia coli ATCC 9637 | 0.57 |
| Aerobacter aerogenes IFO 3317 | 0.58 |
| Proteus mirabilis IFO 3849 | 0.40 |
| Erwinia carotovora IFO 3057 | 0.58 |
| Pseudomonas fragi IFO 3458 | 0.45 |
| Xanthomonas pruni IFO 3511 | 0.49 |
| Protaminobacter alboflavus IFO 3707 | 0.41 |
| Flavobacterium arborescens ATCC 4358 | 0.54 |
| Achromobacter petrophilum FERM P No.239 | 0.35 |
| Agrobacterium tumefaciens IFO 3058 | 1.20 |
| Azotobacter agilis IFO 3741 | 0.25 |
| Nocardia asteroides IFO 3384 | 0.48 |
| Streptomyces aureus ATCC 3309 | 0.25 |
| Aspergillus oryzae IFO 4075 | 0.25 |
| Penicillium chrysogenum ATCC 15241 | 0.24 |

EXAMPLE 3

The microorganisms shown in Table 2 were individually inoculated in a shaking flask containing 50 ml. of a liquid medium (pH 6.5) containing 5% of glycerol, 0.2% of $NH_4NO_3$, 0.2% of urea, 0.1% of yeast extract, 0.1% of $KH_2PO_4$, 0.1% of $K_2HPO_4$, 0.05% of $MgSO_4$.7-$H_2O$, 0.01% of NaCl, 0.001% of $FeSO_4$.$7H_2O$ and 1% of $CaCO_3$, and cultured while shaking the flask reciprocally at 30°C. At the 24th hour of the cultivation, 1.5 mg/ml. of 5-MI was added to the medium, and the cultivation was continued for an additional 24 hours. As a result, L-5-MTP was produced and accumulated in the medium in such amounts as shown in Table 2.

Table 2

| Microorganism | L-5-MTP (mg/ml) |
|---|---|
| Saccharomyces cerevisiae ATCC 7754 | 0.25 |
| Candida petrophilum ATCC 20226 | 0.32 |
| Torulopsis petrophilum ATCC 20225 | 0.22 |
| Brettanomyces petrophilum ATCC 20224 | 0.31 |
| Hansenula anomala IFO 0118 | 0.55 |

What we claim is:

1. A process of producing L-5-methoxytryptophan comprising contacting 5-methoxyindole in a culture medium at a pH of from 4 to 10 and at a temperature of from 20°C. to 40°C. with a microorganism selected from the group consisting of:
Brevibacterium ammoniagenes ATCC 6872,
Corynebacterium sp. No. 14001 NRRL B-5395,
Cornebacterium melassecola ATCC 17965,
Arthrobacter globiformis ATCC 8010,
Microbacterium ammoniaphilum ATCC 15354,
Micrococcus luteus ATCC 21102, Sarcina lutea ATCC 15176,
Staphylococcus citreus ATCC 4012,
Bacillus subtilis ATCC 14593,
Serratia marcescens IFO 3046,
Escherichia coli ATCC 9637,
Aerobacter aerogenes IFO 3317,
Proteus mirabilis IFO 3849,
Erwinia carotovora IFO 3057,
Pseudomonas fragi IFO 3458,
Xanthomonas pruni IFO 3511,
Protaminobacter alboflavus IFO 3707,
Flavobacterium arborescens ATCC 4358,
Agrobacterium tumefaciens IFO 3058,
Saccharomyces cerevisiae ATCC 7754,
Candida petrophilum ATCC 20226,
Torulopsis petrophilum ATCC 20225,
Brettanomyces petrophilum ATCC 20224,
Hansenula anomala IFO 0118,
Nocardia asteroides IFO 3384,
Streptomyces aureus ATCC 3309,
Aspergillus oryzae IFO 4075, and
Penicillium chrysogenum ATCC 15241.

2. A process according to claim 1, wherein the microorganism is allowed to grow in the presence of said 5-methoxyindole together with or without serine.

3. A process according to claim 1, wherein said 5-methoxyindole together with or without serine is added to a suspension of said microorganism which has been cultured and has been taken out of said culture medium.

4. A process according to claim 1, wherein said 5-methoxyindole is added incrementally to said culture medium.

5. A process according to claim 3, wherein said 5-methoxyindole is added incrementally to said culture medium.

* * * * *

UNITED STATES PATENT OFFICE
CERTIFICATE OF CORRECTION

PATENT NO. : 3,915,795
DATED : October 28, 1975
INVENTOR(S) : NAKAO KITAJIMA et al It is certified that error appears in the above-identified patent and that said Letters Patent are hereby corrected as shown below:

First page of patent, in the Abstract: replace
"1-5-Methoxy tryptophan" with
--- L-5-Lower alkoxytryptophan ---.

Column 1, line 54: replace "know" with --- known ---.

Column 4, line 44: after "methoxy", replace "groups" with --- group ---.

Column 6, lines 20-21: after "21102", delete "Sarcina lutea" at line 20; at line 21, insert "Sarcina lutea" before "ATCC".

UNITED STATES PATENT OFFICE
CERTIFICATE OF CORRECTION

PATENT NO. : 3,915,795
DATED : October 28, 1975
INVENTOR(S) : NAKAO KITAJIMA et al It is certified that error appears in the above-identified patent and that said Letters Patent are hereby corrected as shown below:

1) Column 2, lines 27 and 28: delete "the" before "colorimetric"; insert --- the --- before "xanthydrol".

2) Column 2, line 34, and Column 5, line 30: replace "coil" with --- coli ---.

3) Column 6, line 16, Claim 1: replace "Cornebacterium" with --- Corynebacterium ---.

Signed and Sealed this fourth Day of May 1976

[SEAL]

Attest:

RUTH C. MASON
Attesting Officer

C. MARSHALL DANN
Commissioner of Patents and Trademarks